(12) United States Patent
Salimi et al.

(10) Patent No.: US 11,745,449 B2
(45) Date of Patent: Sep. 5, 2023

(54) ADHESIVE BARRIER DESIGN TO ENSURE PROPER PASTE FLOW DURING BLADE CLOSE PROCESS

(71) Applicant: TPI Composites, Inc., Warren, RI (US)

(72) Inventors: Amir Salimi, Providence, RI (US); Christopher Raine, Cranston, RI (US)

(*) Notice: Subject to any disclaimer, the term of this patent is extended or adjusted under 35 U.S.C. 154(b) by 77 days.

(21) Appl. No.: 16/660,258

(22) Filed: Oct. 22, 2019

(65) Prior Publication Data

US 2020/0122416 A1    Apr. 23, 2020

Related U.S. Application Data

(60) Provisional application No. 62/748,835, filed on Oct. 22, 2018.

(51) Int. Cl.
| | | |
|---|---|---|
| *B29C 70/74* | (2006.01) | |
| *B29C 70/84* | (2006.01) | |
| *B29C 70/68* | (2006.01) | |
| *B29C 70/42* | (2006.01) | |

(52) U.S. Cl.
CPC ............ *B29C 70/742* (2013.01); *B29C 70/42* (2013.01); *B29C 70/682* (2013.01); *B29C 70/845* (2013.01)

(58) Field of Classification Search
CPC ..... B29C 66/54; B29C 66/342; B29C 70/845; B29C 66/52293; B29C 45/14467
USPC ........................................................ 264/259
See application file for complete search history.

(56) References Cited

U.S. PATENT DOCUMENTS

| | | | |
|---|---|---|---|
| 7,824,592 B2 | 11/2010 | van Breugel et al. | |
| 7,895,746 B2 | 3/2011 | Bech et al. | |
| 8,047,799 B2 | 11/2011 | Nies | |
| 8,409,381 B2 * | 4/2013 | Ramm | ................. F03D 1/0675 156/64 |
| 9,702,339 B2 | 7/2017 | Liu | |
| 9,945,354 B2 | 4/2018 | Shair et al. | |

(Continued)

FOREIGN PATENT DOCUMENTS

| | | |
|---|---|---|
| WO | WO-2017/220596 A1 | 12/2017 |
| WO | WO-2017/220665 A1 | 12/2017 |
| WO | WO-2020/086600 A1 | 4/2020 |

OTHER PUBLICATIONS

International Search Report and Written Opinion for International Application No. PCT/US19/57463 dated Jan. 14, 2020.

(Continued)

*Primary Examiner* — Hana C Page
(74) *Attorney, Agent, or Firm* — Stephen J. Kenny; Vincenzo DiMonaco; Foley Hoag LLP

(57) ABSTRACT

Devices, systems, and methods of improving paste flow during the manufacture of wind turbine blades are provided. When the first turbine blade half is aligned with the second turbine blade half, a gap is formed between the first shell and the bond cap. The assembly includes a first mold half corresponding to the first turbine blade half and a second mold half corresponding to the second turbine blade half. When the first mold is aligned with the second mold, a second gap is formed. A first barrier is disposed within the first gap and a second barrier disposed within the second gap thereby fluidly sealing a volume defined by the first gap and the second gap to direct adhesive paste flow along the blade span between the adjoining leading and trailing edges.

12 Claims, 8 Drawing Sheets

(56) References Cited

U.S. PATENT DOCUMENTS 10,913,214 B2 * 2/2021 Lehmann Madsen ........................ B29C 66/721
2019/0232571 A1 * 8/2019 Schibsbye .......... B29D 99/0028

OTHER PUBLICATIONS

Extended European Search Report for EP Application No. 19875111.7 dated Jun. 15, 2022.

* cited by examiner

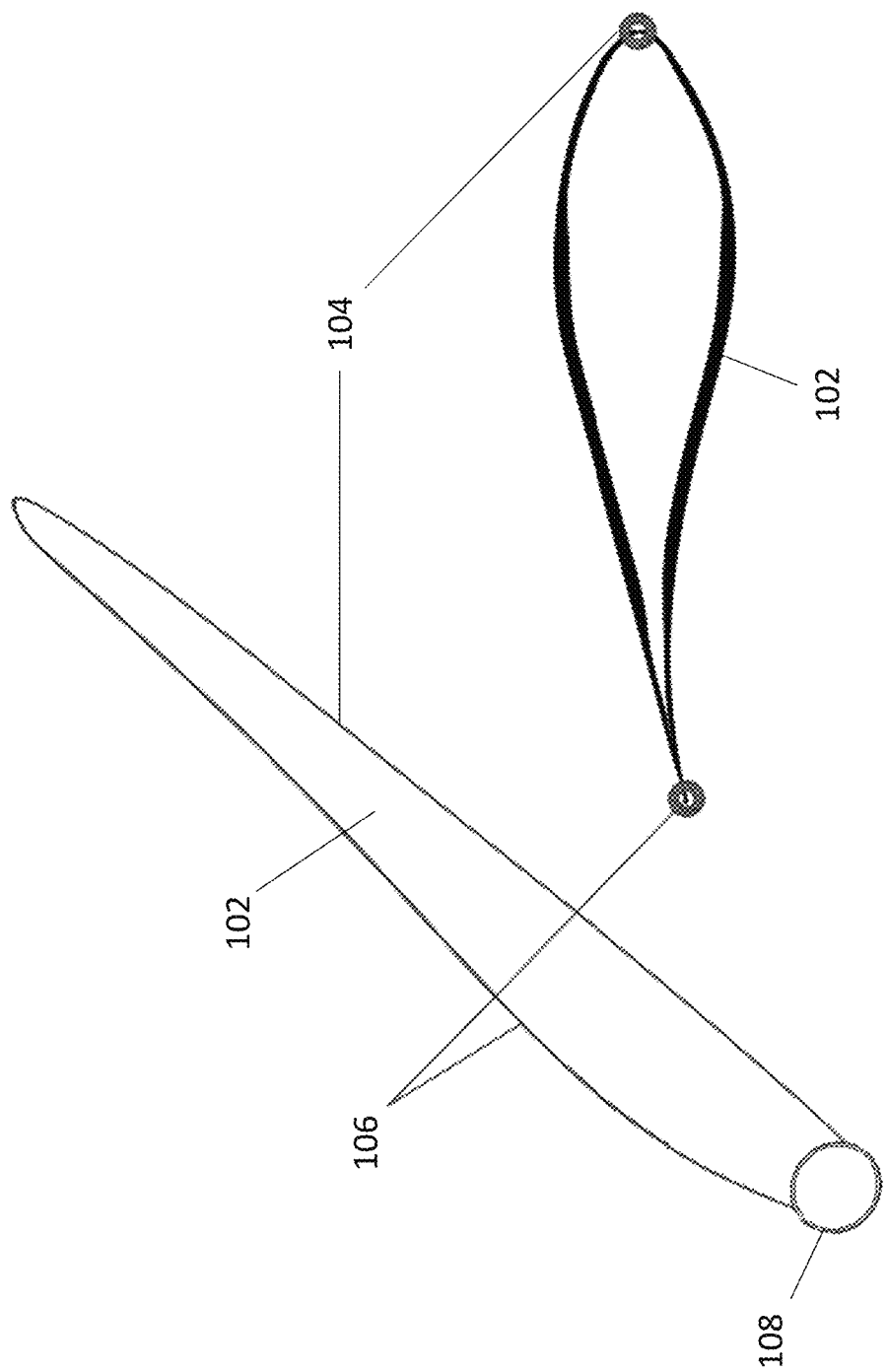

ADHESIVE BARRIER DESIGN TO ENSURE PROPER PASTE FLOW DURING BLADE CLOSE PROCESS

CROSS REFERENCE TO RELATED APPLICATIONS

This application claims the benefit of priority under 35 USC 119 to Provisional application No. 62/748,835 filed Oct. 22, 2018, the entire contents of which are hereby incorporated by reference.

BACKGROUND

Embodiments of the present disclosure relate to devices, systems, and methods of improving paste flow during wind turbine blade manufacture. In particular, the devices, systems, and methods of the present disclosure relate to ensuring proper paste flow and preventing the formation of voids in the paste during a blade close process.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an assembly comprising a first turbine blade half comprising a first shell defining a first perimeter and an first interface surface extending along the first perimeter; a second turbine blade half comprising a second shell defining a second perimeter and a second interface surface extending along the second perimeter, the second blade half comprising a bond cap extending from the perimeter where, when the first interface surface is aligned with the second interface surface, a first gap is formed between the first shell and the bond cap; a first mold half comprising a first mold surface corresponding to the first shell; a second mold half comprising a first mold surface corresponding to the second shell where, when the first mold is aligned with the second mold, a second gap is formed between the first mold and the second mold, wherein the first gap is in fluid communication with the second gap; a first barrier disposed within the first gap; and a second barrier disposed within the second gap thereby fluidly sealing a volume defined by the first gap and the second gap. In some embodiments, a paste disposed on the first interface surface and/or the second interface surface. In some embodiments, the width of the first gap is between about 2 mm and 15 mm. In some embodiments, the width of the second gap is between about 2 mm and 15 mm. In some embodiments, a vent is included on the second barrier. In some embodiments, the vent is one of a plurality of vents on the second barrier. In some embodiments, the plurality of vents are spaced at a predetermined distance from one another. In some embodiments, a plurality of barriers are uniformly spaced along the leading and trailing edge of the blade. In some embodiments, the first barrier is permanently attached to at least one of the first turbine blade half and the second turbine blade half. In some embodiments, the second barrier is removably attached to at least one of the first mold half and the second mold half. In accordance with another aspect of the disclosure, a method of forming a wind turbine blade is provided which comprises: providing a first turbine blade half comprising a first shell defining a first perimeter and an first interface surface extending along the first perimeter; providing a second turbine blade half comprising a second shell defining a second perimeter and a second interface surface extending along the second perimeter, the second blade half comprising a bond cap extending from the perimeter where, when the first interface surface is aligned with the second interface surface, a first gap is formed between the first shell and the bond cap; providing a first mold half comprising a first mold surface corresponding to the first shell, the first turbine blade half disposed within the first mold half; providing a second mold half comprising a first mold surface corresponding to the second shell where, when the first mold is aligned with the second mold, a second gap is formed between the first mold and the second mold, wherein the first gap is in fluid communication with the second gap, the second turbine blade half disposed within the second mold half; applying a paste to the first interface surface and/or the second interface surface; positioning a first barrier on the bond cap and a second barrier on the second mold; contacting the first perimeter and the second perimeter; and contacting the first mold with the second mold to thereby fluidly seal a volume defined by the first gap and the second gap.

BRIEF DESCRIPTION OF THE SEVERAL VIEWS OF THE DRAWINGS

FIG. 1A illustrates an exemplary wind turbine blade according to embodiments of the present disclosure.

FIG. 1B illustrates a cross section of the wind turbine blade of FIG. 1A according to embodiments of the present disclosure.

DETAILED DESCRIPTION

Figure 2A:
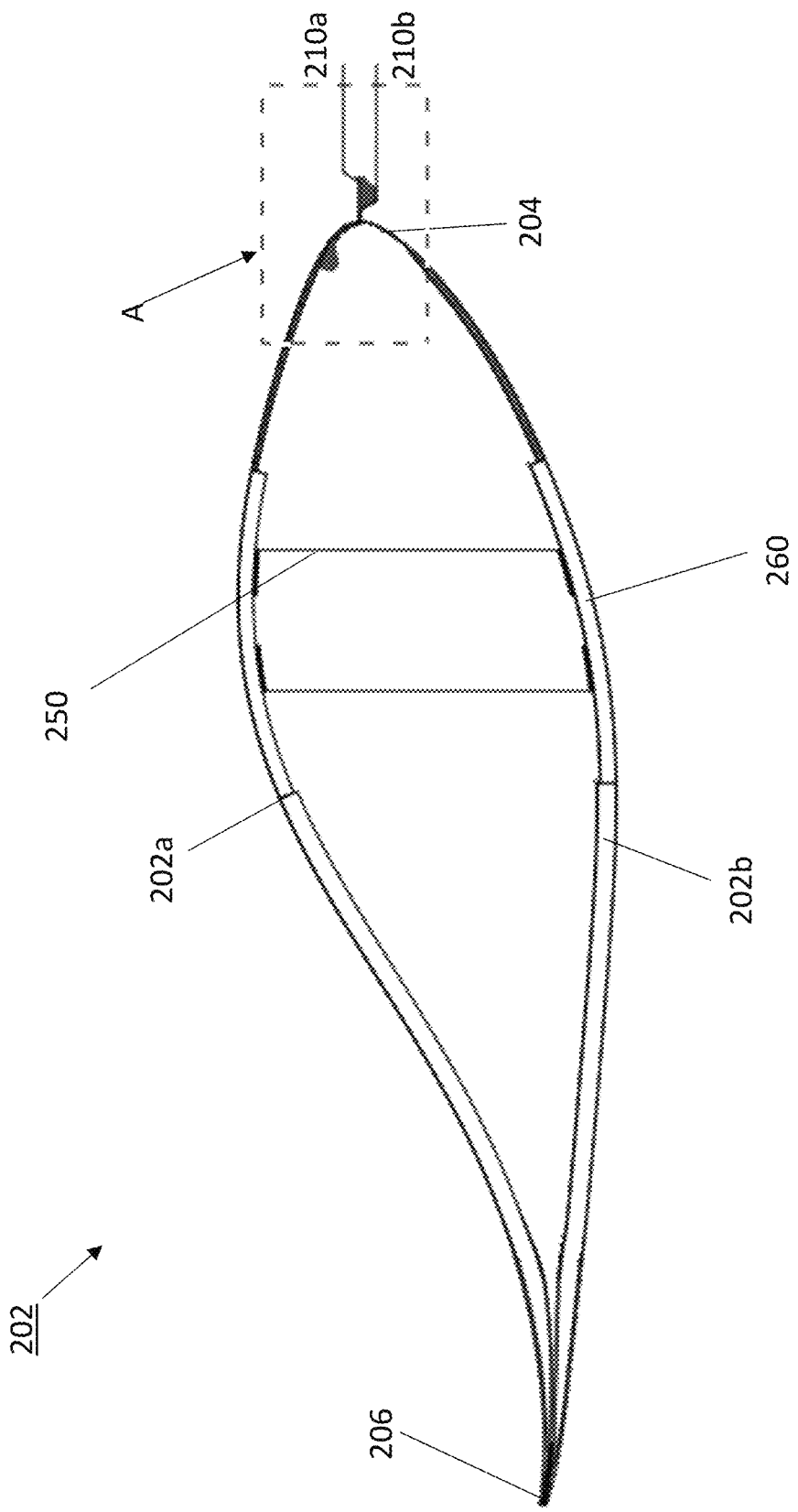
FIG. 2A illustrates a cross-section of an exemplary wind turbine blade during blade closure according to embodiments of the present disclosure.

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

A typical turbine blade is made by molding two half-shells in a pair of molds. A spar cap (analogous to the spar in an aircraft wing), web stiffeners (ribs) and other details may be optionally installed into one of the blade halves. Adhesive is applied to the bonding perimeter/edges of the first shell, for example, in equally-spaced beads. The second half shell is then turned over, still in its mold tool, and lowered onto the first. The molds are pressed together and the adhesive is allowed to cure, joining the two halves of the blade together. This process by which the two blade halves are joined together with paste is called blade closure.

The seam along which the two blade halves are joined is a critical junction to the structural integrity of the complete turbine blade. During blade closure, the paste (usually applied in the form of spaced beads along the blade half perimeter) must fill all void space between the two blade halves to avoid any manufacturing defects. However, when the two blade halves are pressed together and because the paste is generally a viscous liquid, the paste may not fill the entire space between the two blade halves, thus forming air voids in the bonding seam that may compromise structural integrity. Ultrasonic testing may be implemented as quality control to ensure that no air voids are present, and, if air voids are determined to be present, additional paste may be injected into the void space to fill the void. However, this process of screening the entire bond seam is expensive (requiring both technician time and expensive testing equipment) and time intensive. Accordingly, a need exists for a system to improve paste flow during blade closure and prevent the formation of air voids in the paste.

In various embodiments, the mold and/or barriers may be made out of any suitable metal as is known in the art. In various embodiments, the mold and/or barriers may include a metal, such as, for example, aluminum, steel, stainless steel, titanium, tantalum, tungsten, or any suitable combination of metals (e.g., a metal alloy). In various embodiments, the mold and/or barriers may include a polymer, for example, polyethylene, polyurethane, polyethylene terephthalate, polyvinyl chloride, etc. In various embodiments, the mold and/or barriers may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

FIG. 1A illustrates an exemplary wind turbine blade 102 according to embodiments of the present disclosure. A wind turbine blade 102 includes a shell having a leading edge 104 and a trailing edge 106. Any suitable number of blades 102 (e.g., three) may be connected to a hub of a wind turbine at a blade root 108 such that, when wind passes over the blades 102, the blades 102 cause the hub to rotate thereby generating electrical power.

FIG. 1B illustrates a cross section of the wind turbine blade 102 of FIG. 1A according to embodiments of the present disclosure. The cross-section of the wind turbine blade 102 is generally shaped as an airfoil and includes a leading edge 204 and a trailing edge 206 as described above.

FIG. 2A illustrates a cross-section of an exemplary wind turbine blade 202 during blade closure according to embodiments of the present disclosure. The wind turbine blade 202 is generally shaped as an airfoil having a leading edge 204 and a trailing edge 206 and is manufactured from a polymer reinforced composite. During manufacture of the blade 202, the blade 202 may be manufactured as two halves (first half 202a and second half 202b) and subsequently fixed to one another by, for example, an adhesive paste applied at the interface. To affix the first blade half 202a to the second blade half 202b, paste is applied to the perimeter of one or both blade halves 202a, 202b. In some embodiments, adhesive is applied at select locations along the blade span; in some embodiments, the adhesive is applied continuously along the entire blade span. Each blade half 202a, 202b is positioned inside of the respective mold half 210a, 210b and the mold halves 210a, 210b and blade halves 202a, 202b are brought together.

As shown in FIG. 2A, the present disclosure is applicable to a variety of blade designs, including ones with shear web(s) 250 and corresponding spar caps 260. The upper and lower mold skins can also include a core material, e.g. having an increasing thickness from the midpoint to trailing edge of the blade.

Figure 2B:
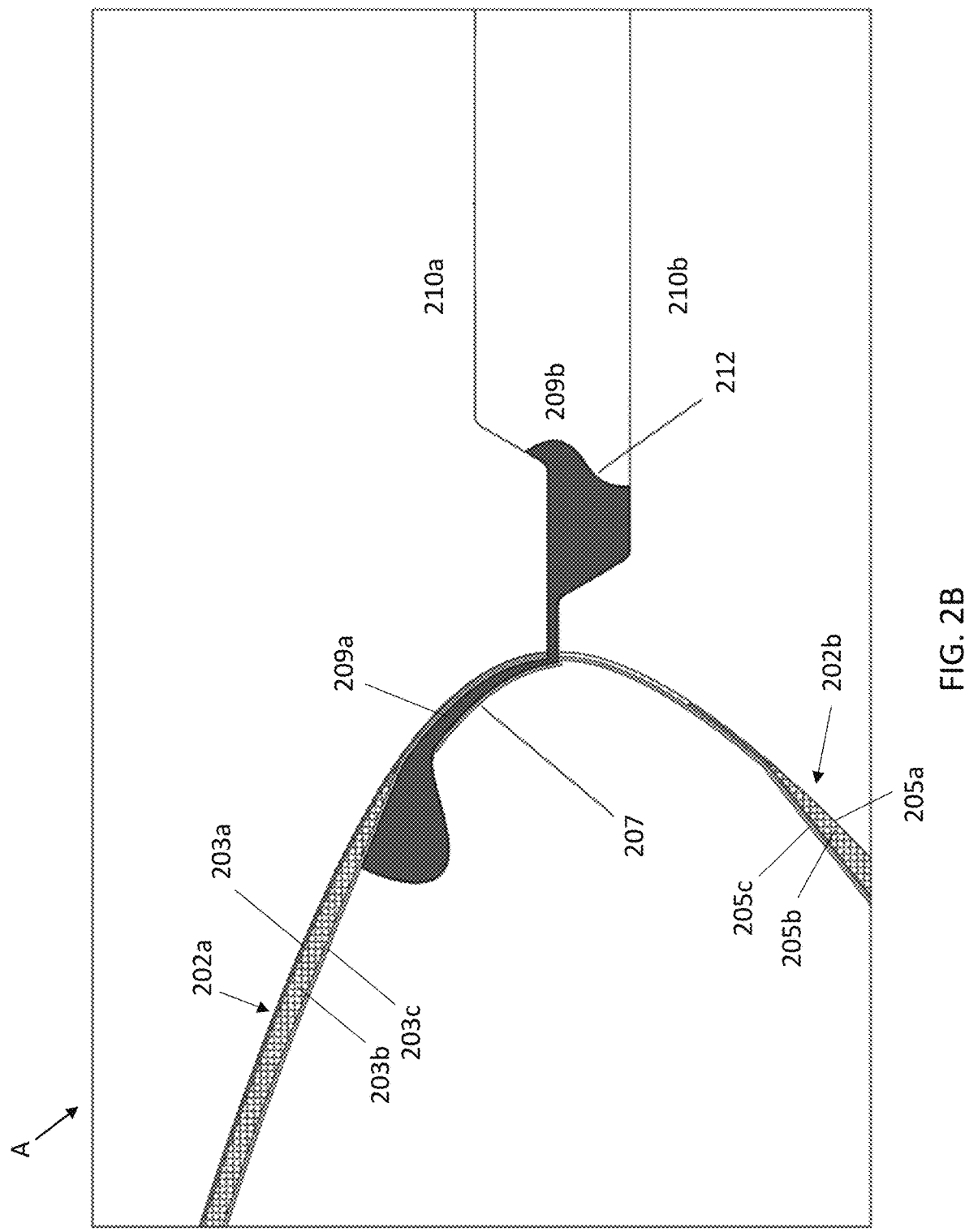
FIG. 2B illustrates a cross-section of the leading edge of the wind turbine blade of FIG. 2A during blade closure according to embodiments of the present disclosure.

FIG. 2B illustrates a cross-section of the leading edge 204 of the wind turbine blade 202 of FIG. 2A during blade closure according to embodiments of the present disclosure. Window A shows a magnified portion of the leading edge 204 of wind turbine blade 202. As shown in FIG. 2B, the blade half 202a includes an outer shell 203a, a core 203b, and an inner shell 203c. The inner and outer shells 203a, 203c are made of a fiber-reinforced polymer, such as fiberglass-reinforced epoxy resin. Other suitable fiber reinforcements may be incorporated together with other fibers or independently, such as, for example, carbon fiber (unidirectional and/or bidirectional), Kevlar, fiberglass (unidirectional and/or bidirectional), etc. Moreover, the inner and outer shells 203a, 203c may include any suitable number of layers of fiber reinforcement for the desired thickness and properties of the part. The core 203b is made of any suitable material, such as, for example, a polymer foam (e.g., polyurethane, divinylcell, polyisocyanurate, etc.), a sandwich core (e.g., nomex honeycomb, aluminum honeycomb, balsa, etc.), and/or a polymer honeycomb material.

Similar to the first blade half 202a, second blade half 202b includes an outer shell 205a, a core 205b, and an inner shell 205c. The inner and outer shells 205a, 205c are similarly made of a fiber-reinforced polymer and the core 205b is similarly made of a suitable core material, such as, for example, a polymer foam. The second blade half 202b further includes a bond cap 207 extending from the perimeter/edge of the blade half 202b such that, when the first blade half 202a and the second blade half 202b are brought together (after paste 212 is applied to the perimeter), a gap 209a is formed between the bond cap 207 and the first blade half 202a. The length of the bond cap depends on the particular blade type (size, materials, etc.), in some embodiments, the bond cap 207 is positioned along most, if not all, of the leading edge length; whereas on the trailing edge side, the bond cap extends from the root to approximately the 20 meter mark of the blade span. Moreover, when the first mold half 210a and second mold half 210b are brought together, a gap 209b is formed between the two mold halves 210a, 210b into which paste 212 may flow as pressure is applied to press the two mold halves 210a, 210b together.

Figure 2C:
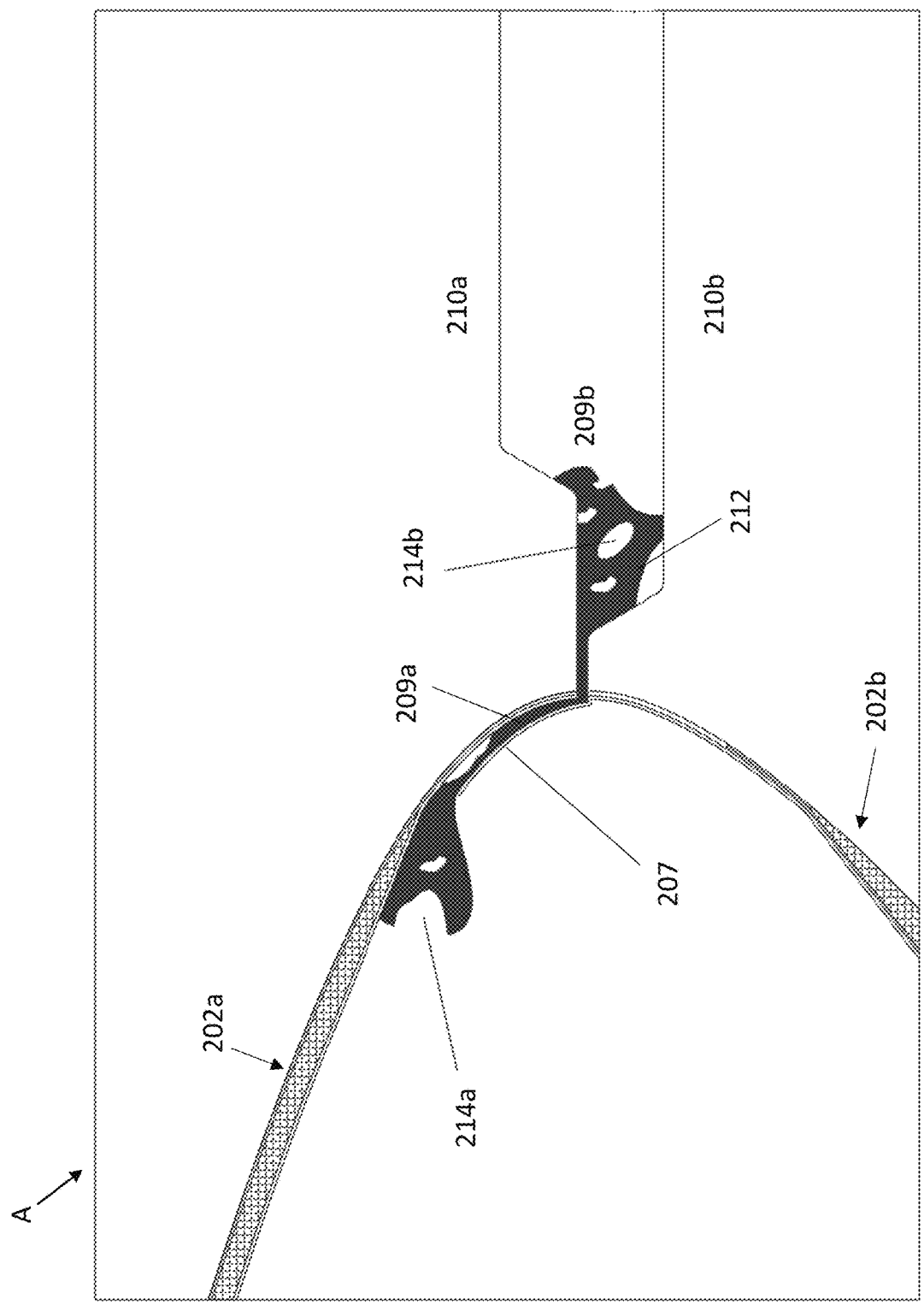
FIG. 2C illustrates a cross-section of the leading edge of the wind turbine blade of FIG. 2A during blade closure according to embodiments of the present disclosure.

FIG. 2C illustrates a cross-section of a leading edge of the wind turbine blade of FIG. 2A during blade closure according to embodiments of the present disclosure. As the mold halves 210a, 210b are brought together during blade closure, the paste 212 is free to flow into the gaps 209a between the bond cap 207 and the first blade half 202a and between the two mold halves 210a, 210b. In various scenarios, however, internal air voids 214b and/or external air voids may form in the paste 212, and remain in the paste as the paste cures. While many causes of air voids exist, one common cause is incomplete paste flow between the two blade halves 202a, 202b. The presence of such air voids 214b can jeopardize the structural integrity of the blade and adversely impact blade performance. As shown, these air voids can exist both within the portion of the paste applied internally 214a and externally 214b of the blade.

Figure 3:
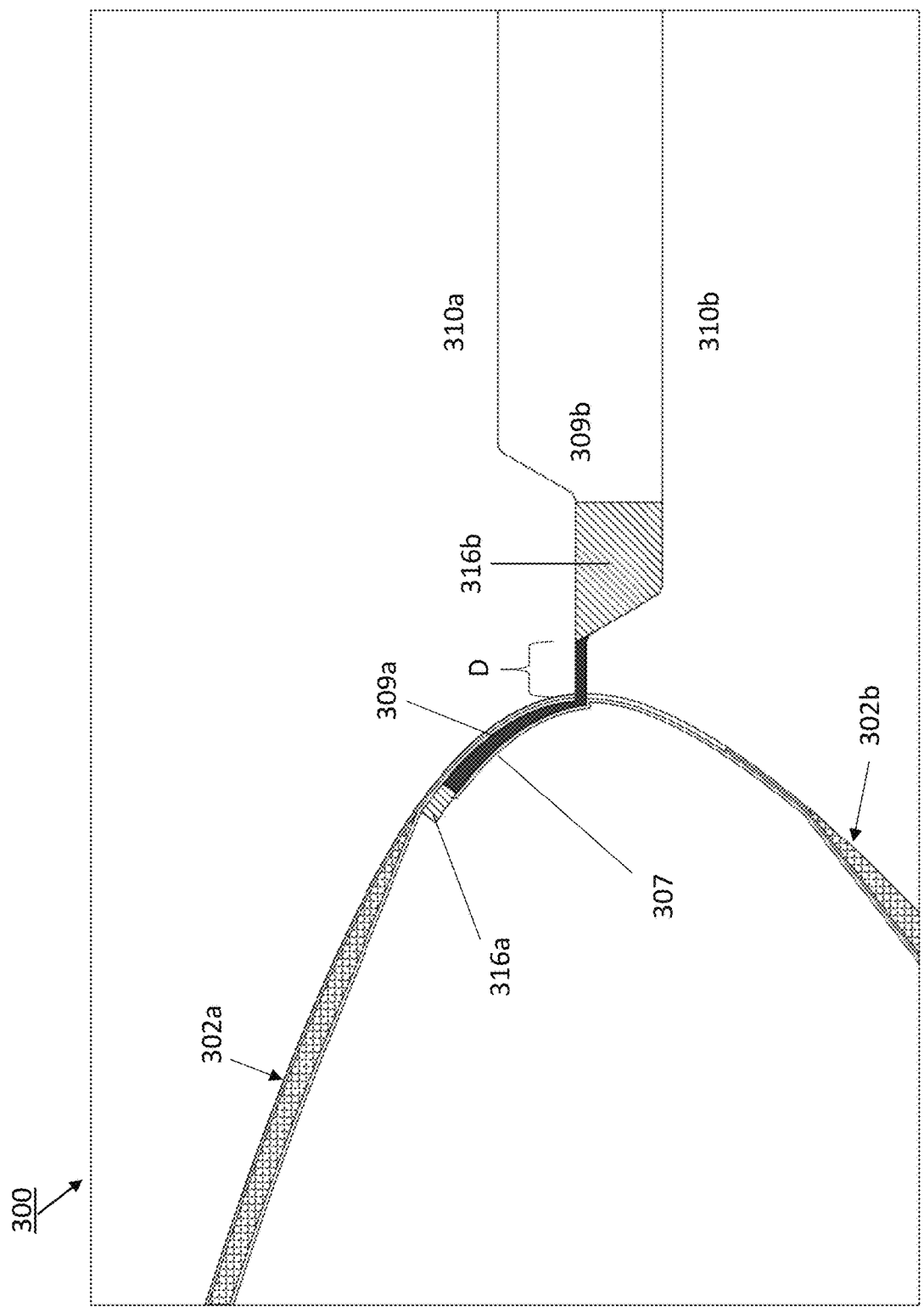
FIG. 3 illustrates a magnified portion of a cross-section of a leading edge of an exemplary wind turbine blade during blade closure according to embodiments of the present disclosure.

FIG. 3 illustrates a magnified portion 300 of a cross-section of a leading edge of an exemplary wind turbine blade during blade closure according to embodiments of the present disclosure. Similar to FIGS. 2A-2C above, the wind turbine blade includes a first blade half 302a inside a first mold half 310a and a second blade half 302b inside a second mold half 310b. The second blade half 302b includes a bond cap 307 extending from the perimeter of the second blade half 302b such that, when the first blade half 302a and second blade half are aligned with one another, a gap 309a is formed therebetween. Moreover, when the first mold half 310a and second mold half 310b are aligned, a gap 309b is formed therebetween that is in fluid communication with gap 309a. In an exemplary embodiment, the gap 309b can be approximately 2 mm to 15 mm in size.

In FIG. 3, a first barrier 316a is inserted into the gap 309a defined by the bond cap 307 and the first blade half 309 and a second barrier 316b is inserted into the gap 309b defined by the first mold half 310a and the second mold half 310b. The first barrier 316a is positioned inside the blade while the second barrier 316b is placed outside the blade. The first barrier 316a and the second barrier 316b fluidly seal the paste within the gaps 309a, 309b and prevent any leakage of paste out of the gaps 309a, 309b. Providing these barriers 316a, 316b allows controlled flow of paste such that the paste fills the space around the perimeter of the two blade halves 302a, 302b, thereby preventing the formation of voids (both external and internal) in the paste. In other words, the paste is restricted from flowing in an interior/exterior direction and instead directed along the span of the blade. In various embodiments, the first barrier 316a may be installed on the skin surface of the first blade half 302a. Additionally or alternatively, the first barrier 316a can be installed on the bond cap 307. In various embodiments, the second barrier 316b may be installed on either the mold flange 310a, 310b. Additionally, the first barrier 316a can be permanently attached (e.g. adhesive) to the interior of the blade, whereas the exterior barrier 316b can be removably attached (such as by fasteners, e.g. screw, etc.) to the mold surfaces 310a or 310b for repeated use thereof.

The first and second barriers may be made out of any suitable plastics or foam, such as, for example, polyethylene foam. The first barrier 316a can be positioned such that a front edge of the barrier 316a extends beyond the bond cap to create an overlapping region, as shown in FIG. 3. Positioning the barrier 316a at this location is advantageous in that it prevents paste from flowing beyond the bond cap 307 and accumulating in a bulbous/bead as shown in FIG. 2B—which undesirably adds weight to the blade design and can adversely impact blade performance.

As shown in FIG. 3, the second, external, barrier 316b can be installed a distance "D" from the leading edge of the blade. Positioning the barrier 316b as shown is advantageous in that it reduces the amount of paste applied, as it eliminates the formation of a bulbous/bead 212 between the mold halves 210a, 210b. Accordingly, the barrier 316b can be positioned as close as possible to the leading edge. Accordingly, the devices and techniques disclosed herein improve manufacturing cycle time and reduce waste/costs. The barrier 316b can extend to fill the space between the upper and lower mold halves 310a, 310b. Consequently, in some embodiments the amount of paste applied on the internal side of the blade is greater than the amount of paste applied on the external side of the blade.

In some embodiments, the barriers can extend around the entire perimeter of the blade. In some embodiments, the barriers can extend along the bond caps. In some portions of the blade no bond cap is present, e.g. trailing edge. Accordingly the interior barrier 316a is in contact with the interior surfaces of both the upper/suction side of the blade as well as the lower/pressure side of the blade. The dimensions and shape of the barriers can vary provided they present sufficient mass/rigidity to prevent adhesive from flowing beyond their locations.

Figure 4:
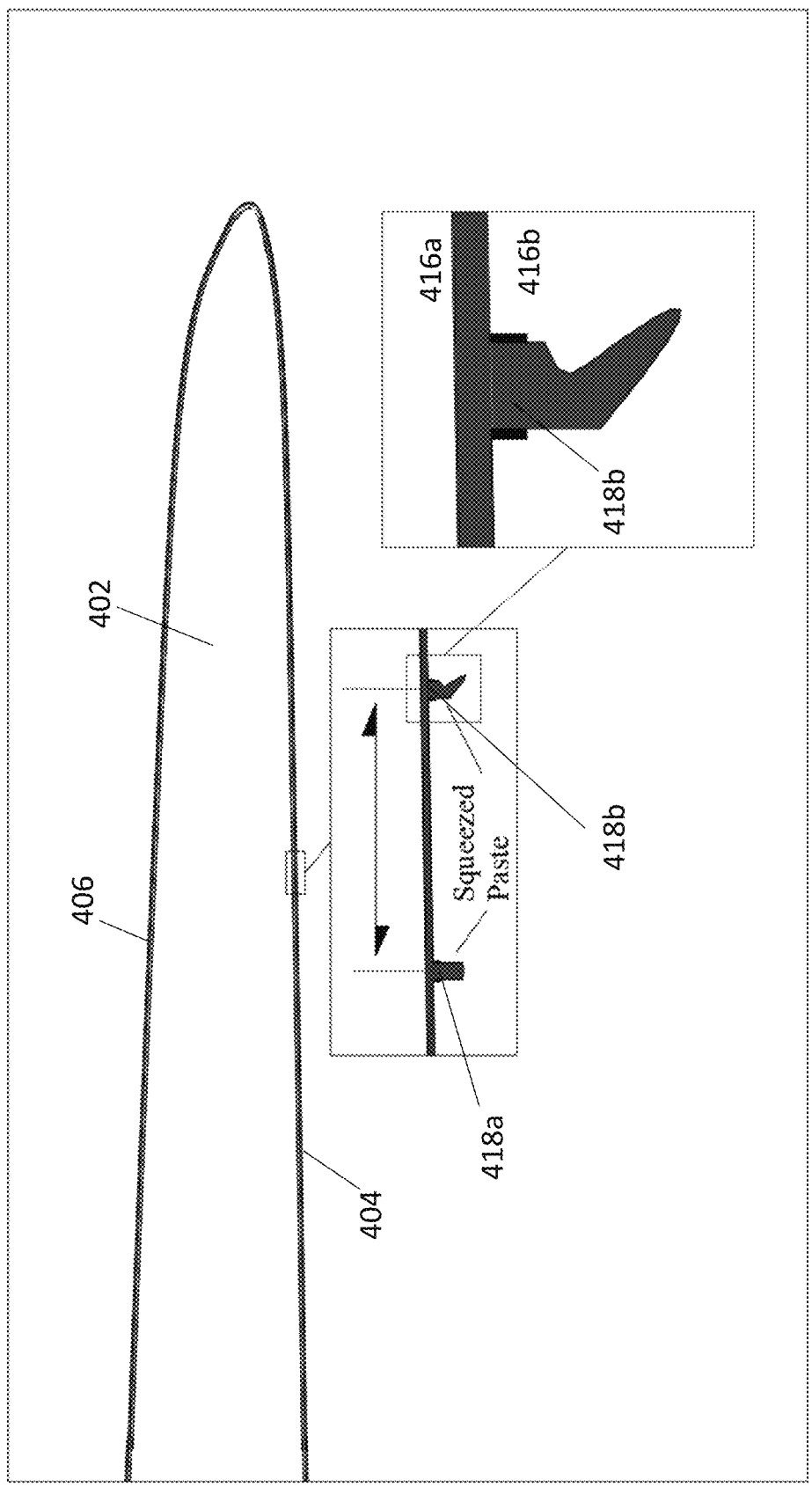
FIG. 4 illustrates a top view of an exemplary wind turbine blade during blade closure according to embodiments of the present disclosure.
Figure 4A:
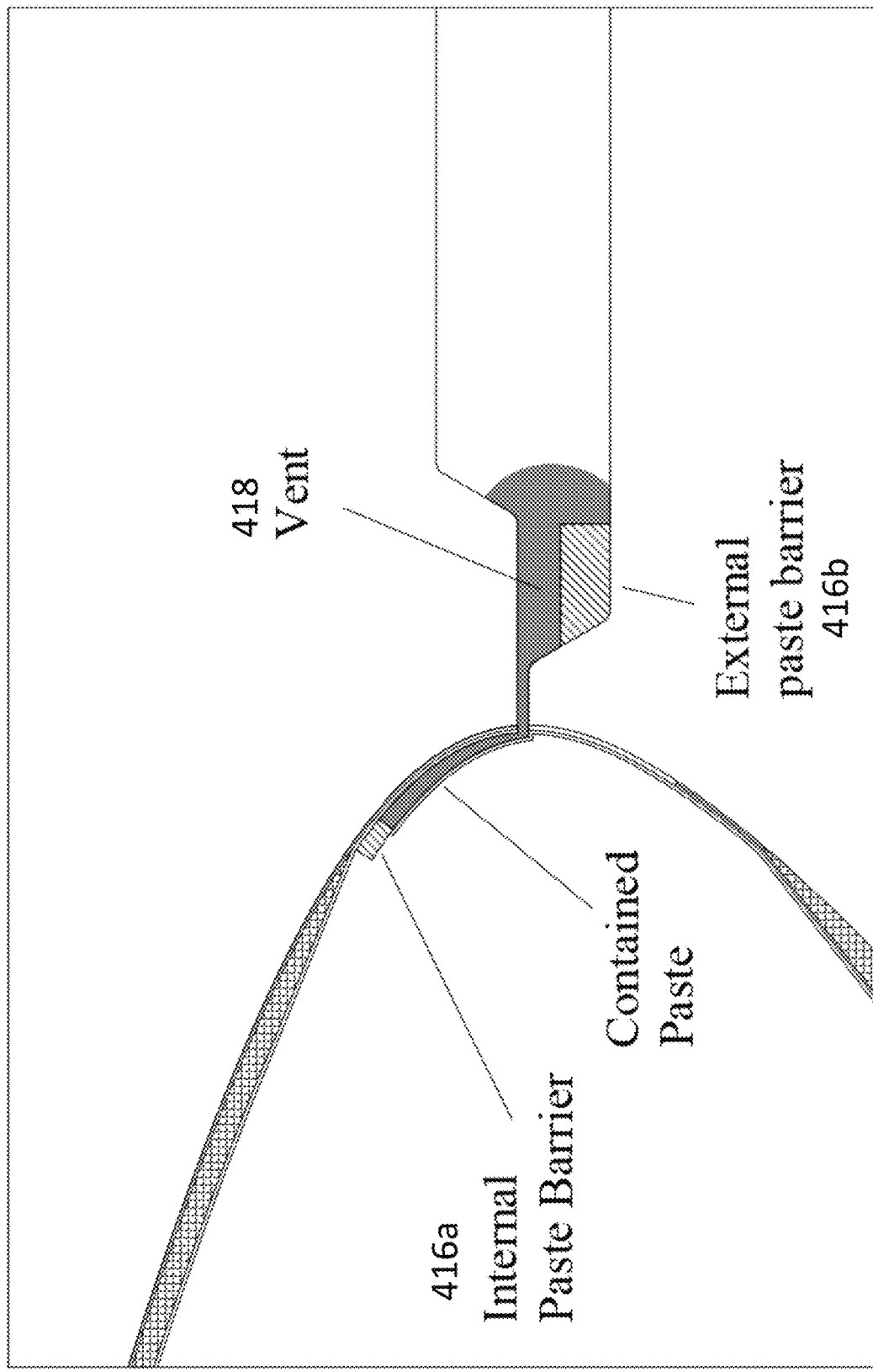
FIG. 4A illustrates a cross-section of an external barrier and vent design according to embodiments of the present disclosure.

FIG. 4 illustrates an exemplary wind turbine blade 402 during blade closure according to embodiments of the present disclosure. The wind turbine blade 402 may be similar to the blades shown in FIGS. 1-3 and include a leading edge 404, a trailing edge 406, and two blade halves disposed in respective mold halves as described above. Each half of the blade 402 includes a perimeter that extends substantially around the entire blade that, when aligned with one another, forms a complete blade. The blade 402 may further include a first barrier 416a disposed between a bond cap and the first blade half and a second barrier 416b as described above. In FIG. 4, the second barrier 416b (i.e., the external barrier between the two mold halves) includes a plurality of vents 418a, 418b disposed along the length of the blade 402. The vents can be operable to selectively open/close such that an operator can operate each vent independently to adjust pressure as desired, e.g. to draw the paste from the root towards the tip to facilitate bonding. The vents 418a, 418b may have any suitable shape (e.g. circular). In some embodiments, the vents allow for paste to migrate into and fill the vent and include an inspection feature (e.g. window, aperture, frangible membrane) which provides a visual confirmation that the paste applied therein (i.e. from the interior barrier up to that particular vent) is free of any air pockets/voids. Additionally or alternatively, the vent can be an opening in the barrier itself, as shown in FIG. 4A.

The vents 418a, 418b may be positioned at any suitable location within the second barrier to thereby vent air (and/or paste) out during the closure process. Each of the plurality of vents 418a, 418b may be spaced along the perimeter of the blade at a predetermined distance, which may be evenly spaced or unevenly spaced, as desired based on the blade dimensions. For example, more vents may be located in areas of the blade requiring more paste to adhere the two blades halves together. As shown in the zoom-in view of FIG. 4, the vents 418 can be positioned on either side of the barrier 416.

In accordance with an aspect of the present disclosure, the shape of the paste exiting the vents can reveal whether any internal air voids have been filled during the squeezing of the two blade halves. For example, where the paste exiting the vent has a uniform (e.g. cylindrical) shape as shown proximate 418a in FIG. 4, it can be determined that no internal voids were encountered by the paste during travel from its application point to exiting of the vent. Conversely, where the paste exiting the vent has a non-uniform (e.g. asymmetric) shape as shown proximate 418*b* in FIG. 4, it can be determined that an internal void(s) was encountered by the paste during travel from its application point to exiting of the vent.

Figure 5:
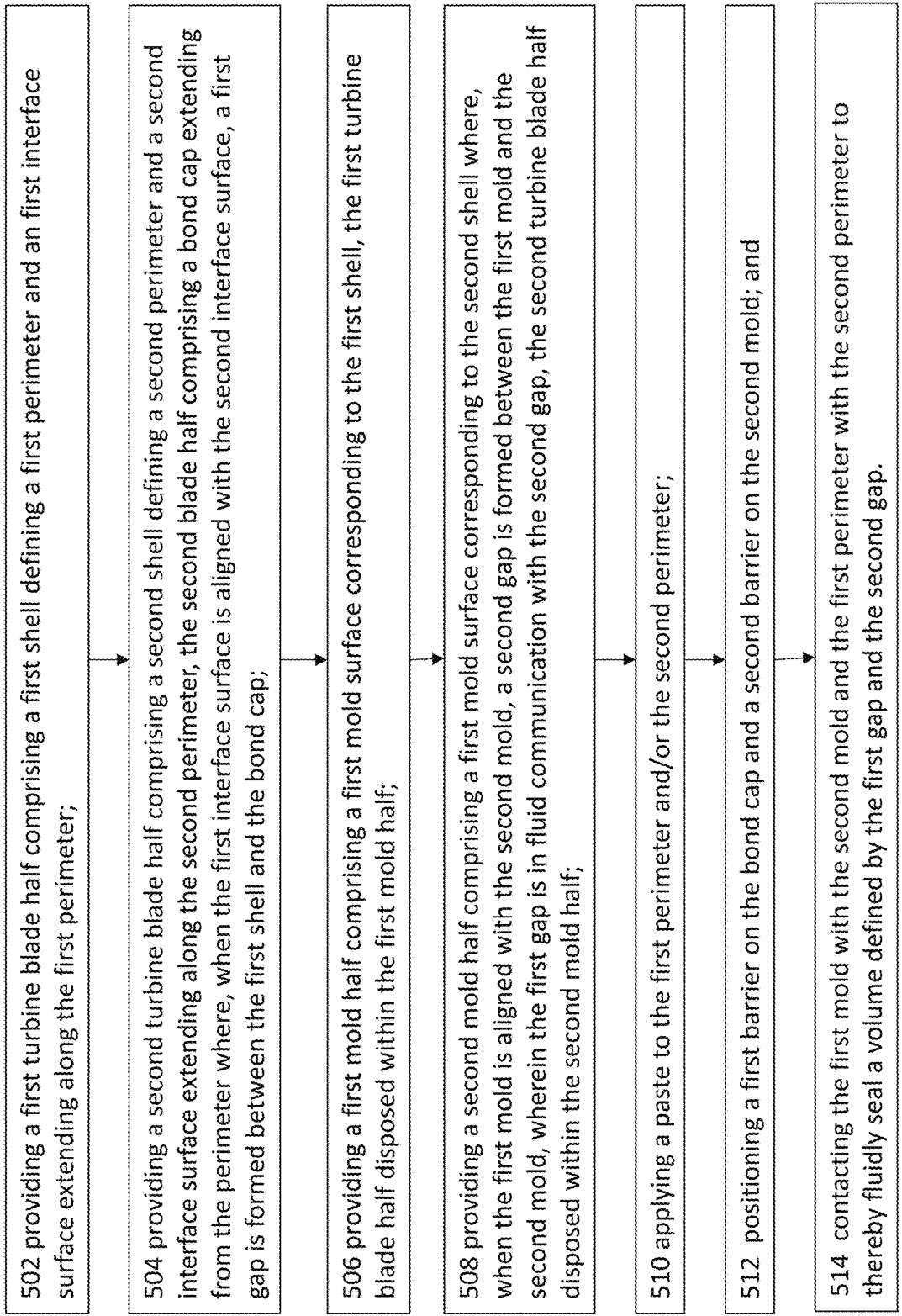
FIG. 5 illustrates a method of wind turbine blade root attachment according to embodiments of the present disclosure.

FIG. 5 illustrates a method 500 of improving paste flow during wind turbine blade manufacture according to embodiments of the present disclosure. At 502, a first turbine blade half is provided having a first shell defining a first perimeter and an first interface surface extending along the first perimeter. At 504, a second turbine blade half is provided having a second shell defining a second perimeter and a second interface surface extending along the second perimeter. The second blade half includes a bond cap extending from the perimeter where, when the first interface surface is aligned with the second interface surface, a first gap is formed between the first shell and the bond cap. At 506, a first mold half is provided having a first mold surface corresponding to the first shell, the first turbine blade half disposed within the first mold half. At 508, a second mold half is provided having a first mold surface corresponding to the second shell where, when the first mold is aligned with the second mold. A second gap is formed between the first mold and the second mold, wherein the first gap is in fluid communication with the second gap, the second turbine blade half disposed within the second mold half. At 510, a paste is applied to the first perimeter and/or the second perimeter. At 512, a first barrier is positioned on the bond cap and a second barrier is positioned on the second mold. At 514, the first mold is contacted with the second mold and the first perimeter is contacted with the second perimeter to thereby fluidly seal a volume defined by the first gap and the second gap.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An assembly comprising:
   a first turbine blade half comprising a first shell defining a first perimeter and a first interface surface extending along the first perimeter;
   a second turbine blade half comprising a second shell defining a second perimeter and a second interface surface extending along the second perimeter, the second blade half comprising a bond cap extending from the perimeter where, when the first interface surface is aligned with the second interface surface, a first gap is formed between the first shell and the bond cap;
   a first mold half comprising a first mold surface corresponding to the first shell;
   a second mold half comprising a first mold surface corresponding to the second shell where, when the first mold half is aligned with the second mold half, a second gap is formed between the first mold half and the second mold half, wherein the first gap is in fluid communication with the second gap;
   a first barrier disposed within the first gap; and
   a second barrier disposed within the second gap thereby fluidly sealing a volume defined by the first gap and the second gap, the second barrier including a vent operable to selectively open or close;
   wherein the vent is formed by at least a portion of one of the first mold half or the second mold half, and at least a portion of the second barrier;
   wherein upon closure of the first mold half and the second mold half, a paste exits the vent.

2. The assembly of claim 1, further comprising the paste is disposed on the first interface surface and/or the second interface surface.

3. The assembly of claim 1, wherein the width of the first gap is between about 2 mm and 15 mm.

4. The assembly of claim 1, wherein the width of the second gap is between about 2 mm and 15 mm.

5. The assembly of claim 1, wherein the vent is one of a plurality of vents on the second barrier.

6. The assembly of claim 5, wherein the plurality of vents are spaced at a predetermined distance from one another.

7. The assembly of claim 1, wherein a plurality of first and second barriers are uniformly spaced along a leading and trailing edge of the first blade half and the second blade half.

8. The assembly of claim 1, wherein the first barrier is permanently attached to at least one of the first turbine blade half and the second turbine blade half.

9. The assembly of claim 1, wherein the second barrier is removably attached to at least one of the first mold half and the second mold half.

10. The assembly of claim 1, wherein the vent on the second barrier is cylindrically shaped.

11. The assembly of claim 1, wherein the vent on the second barrier is asymmetrically shaped.

12. The assembly of claim 1, wherein the vent on the second barrier includes an inspection window to visually confirm the applied paste is free of voids.

* * * * *